United States Patent
Sakuma et al.

(10) Patent No.: US 12,424,654 B2
(45) Date of Patent: Sep. 23, 2025

(54) SECONDARY BATTERY

(71) Applicant: MURATA MANUFACTURING CO., LTD., Kyoto (JP)

(72) Inventors: Tomomi Sakuma, Kyoto (JP); Shinichi Katayama, Kyoto (JP); Hideki Nakai, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 505 days.

(21) Appl. No.: 18/090,780

(22) Filed: Dec. 29, 2022

(65) Prior Publication Data

US 2023/0132785 A1     May 4, 2023

Related U.S. Application Data

(63) Continuation of application No. PCT/JP2021/032812, filed on Sep. 7, 2021.

(30) Foreign Application Priority Data

Sep. 17, 2020    (JP) ................................. 2020-156446

(51) Int. Cl.
*H01M 10/0525*     (2010.01)
*H01M 4/02*     (2006.01)
(Continued)

(52) U.S. Cl.
CPC ....... *H01M 10/0525* (2013.01); *H01M 4/136* (2013.01); *H01M 4/366* (2013.01); *H01M 2004/027* (2013.01); *H01M 2004/028* (2013.01)

(58) Field of Classification Search
CPC ........... H01M 10/052; H01M 10/0525; H01M 2004/027; H01M 2004/028; H01M 4/136; H01M 4/366

See application file for complete search history.

(56) References Cited

U.S. PATENT DOCUMENTS

| | | |
|---|---|---|
| 2008/0096112 A1 | 4/2008 | Ihara et al. |
| 2019/0013543 A1 | 1/2019 | Tao et al. |
| 2019/0148776 A1 | 5/2019 | Cho et al. |

FOREIGN PATENT DOCUMENTS

| | | | | |
|---|---|---|---|---|
| CN | 101320822 A | * | 12/2008 | ............ H01M 4/525 |
| CN | 111082127 A | * | 4/2020 | .......... H01M 50/431 |

(Continued)

OTHER PUBLICATIONS

Machine translation of CN-101320822-A, Muraoka, Yoshiyuki. (Year: 2008).*

(Continued)

*Primary Examiner* — Mayla Gonzalez Ramos
(74) *Attorney, Agent, or Firm* — K&L Gates LLP

(57) ABSTRACT

A secondary battery includes a positive electrode, a negative electrode, a negative electrode wiring line, and an electrolytic solution. The negative electrode wiring line is coupled to the negative electrode. The negative electrode includes a negative electrode active material layer and a film. The film covers a surface of the negative electrode active material layer. The film includes sulfur as a constituent element. The electrolytic solution includes a chain carboxylic acid ester. Where the film is divided, in a direction away from the negative electrode wiring line, into thirds including a first film part, a second film part, and a third film part: a content of sulfur in the first film part, the third film part, or each of the first film part and the third film part is greater than or equal to 11 $\mu mol/m^2$ and less than or equal to 22 $\mu mol/m^2$; a content of sulfur in the second film part is greater than or equal to 7 $\mu mol/m^2$ and less than or equal to 13 $\mu mol/m^2$; and a ratio of the content of sulfur in the first film part, the third film part, or each of the first film part and the third film part to the content of sulfur in the second film part is greater than or equal to 1.2 and less than or equal to 2.1.

5 Claims, 6 Drawing Sheets

(51) Int. Cl.
*H01M 4/136* (2010.01)
*H01M 4/36* (2006.01)

(56) References Cited

FOREIGN PATENT DOCUMENTS

| | | | | |
|---|---|---|---|---|
| JP | 2008098053 | A | | 4/2008 |
| JP | 2012178339 | A | * | 9/2012 |
| JP | 2014232705 | A | | 12/2014 |
| JP | 2016091724 | A | * | 5/2016 |
| JP | 2017010637 | A | | 1/2017 |
| JP | 2019016483 | A | | 1/2019 |

OTHER PUBLICATIONS

Machine translation of JP-2012178339-A, Onuki Masamichi. (Year: 2012).*
Machine translation of JP-2016091724-A, Abe K. (Year: 2016).*
Machine translation of CN-111082127-A, Xiang, Fu-you. (Year: 2020).*
International Search Report of corresponding PCT application PCT/JP2021/032812, dated Nov. 30, 2021.

* cited by examiner

SECONDARY BATTERY

CROSS REFERENCE TO RELATED APPLICATIONS

The present application is a continuation of PCT patent application no. PCT/JP2021/032812, filed on Sep. 7, 2021, which claims priority to Japanese patent application no. JP2020-156446, filed on Sep. 17, 2020, the entire contents of which are herein incorporated by reference.

BACKGROUND

The present technology relates to a secondary battery.

Various kinds of electronic equipment, including mobile phones, have been widely used. Such widespread use has promoted development of a secondary battery as a power source that is smaller in size and lighter in weight and allows for a higher energy density. The secondary battery includes a positive electrode, a negative electrode, and an electrolytic solution. A configuration of the secondary battery has been considered in various ways.

Specifically, in order to reduce internal resistance, a predetermined amount of a film derived from a sulfonic acid compound is provided on a surface of a positive electrode active material, and a predetermined amount of a mix film derived from a sulfonic acid compound and vinylene carbonate is provided on a surface of a negative electrode active material.

Similarly, in order to reduce internal resistance, a predetermined amount of a film derived from a lithium salt having a sulfonic acid skeleton is provided on a surface of a positive electrode active material, and a predetermined amount of a film derived from vinylene carbonate is provided on a surface of a negative electrode active material.

In order to reduce an amount of gas generation during high-temperature storage, a first film derived from a disulfonic acid dilithium salt is provided on a surface of a positive electrode active material, and a predetermined amount of a second film derived from a disulfonic acid dilithium salt and vinylene carbonate is provided on a surface of a negative electrode active material.

In order to suppress an increase in resistance caused by long-term storage, a film including a predetermined amount of sulfur element is provided on a surface of a positive electrode active material.

In order to improve a cyclability characteristic and a storage characteristic, an electrolytic solution includes a cyclic sulfone compound having a structure of $-S(=O)_2-O-S(=O)_2-$.

SUMMARY

The present technology relates to a secondary battery.

Although consideration has been given in various ways to improve performance of a secondary battery, an electric resistance characteristic and a cyclability characteristic of the secondary battery are not sufficient yet. Accordingly, there is still room for further improvement in terms thereof.

It is therefore desirable to provide a secondary battery that is able to achieve a superior electric resistance characteristic and a superior cyclability characteristic.

A secondary battery according to an embodiment includes a positive electrode, a negative electrode, a negative electrode wiring line, and an electrolytic solution. The negative electrode wiring line is coupled to the negative electrode. The negative electrode includes a negative electrode active material layer and a film. The film covers a surface of the negative electrode active material layer. The film includes sulfur as a constituent element. The electrolytic solution includes a chain carboxylic acid ester. Where the film is divided, in a direction away from the negative electrode wiring line, into thirds including a first film part, a second film part, and a third film part: a content of sulfur in the first film part, the third film part, or each of the first film part and the third film part is greater than or equal to 11 $\mu mol/m^2$ and less than or equal to 22 $\mu mol/m^2$; a content of sulfur in the second film part is greater than or equal to 7 $\mu mol/m^2$ and less than or equal to 13 $\mu mol/m^2$; and a ratio of the content of sulfur in the first film part, the third film part, or each of the first film part and the third film part to the content of sulfur in the second film part is greater than or equal to 1.2 and less than or equal to 2.1.

According to the secondary battery of an embodiment, the film of the negative electrode includes sulfur as a constituent element, and the electrolytic solution includes the chain carboxylic acid ester. Further, the film (including the first film part, the second film part, and the third film part) satisfies the above-described conditions regarding: the content of sulfur in the first film part, the third film part, or each of the first film part and the third film part; the content of sulfur in the second film part; and the ratio of the content of sulfur in the first film part, the third film part, or each of the first film part and the third film part to the content of sulfur in the second film part. Accordingly, it is possible to achieve a superior electric resistance characteristic and a superior cyclability characteristic.

Note that effects of the present technology are not necessarily limited to those described herein and may include any of a series of suitable.

DETAILED DESCRIPTION

One or more embodiments of the present technology are described below in further detail including with reference to the drawings.

A description is given first of a secondary battery according to an embodiment.

The secondary battery to be described here is a secondary battery that obtains a battery capacity using insertion and extraction of an electrode reactant, and includes a positive electrode, a negative electrode, and an electrolytic solution which is a liquid electrolyte. In the secondary battery, to prevent precipitation of the electrode reactant on a surface of the negative electrode during charging, a charge capacity of the negative electrode is greater than a discharge capacity of the positive electrode. In other words, an electrochemical capacity per unit area of the negative electrode is set to be greater than an electrochemical capacity per unit area of the positive electrode.

Although not particularly limited in kind, the electrode reactant is specifically a light metal such as an alkali metal or an alkaline earth metal. Examples of the alkali metal include lithium, sodium, and potassium. Examples of the alkaline earth metal include beryllium, magnesium, and calcium.

Examples are given below of a case where the electrode reactant is lithium. A secondary battery that obtains a battery capacity using insertion and extraction of lithium is a so-called lithium-ion secondary battery. In the lithium-ion secondary battery, lithium is inserted and extracted in an ionic state.

Figure 1:
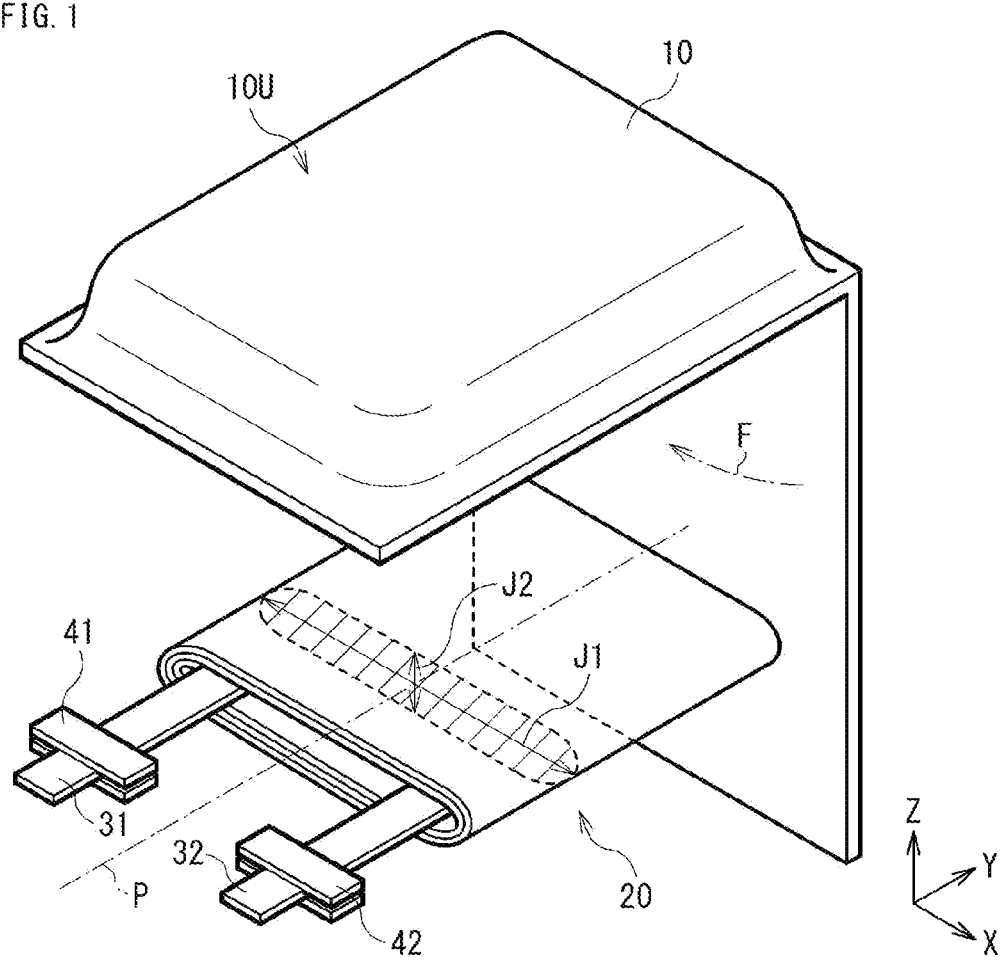
FIG. 1 is a perspective view of a configuration of a secondary battery according to an embodiment.
Figure 2:
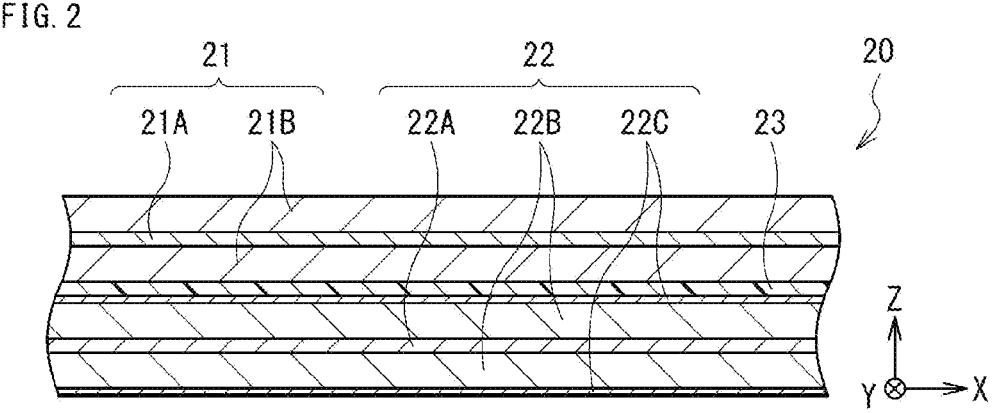
FIG. 2 is a sectional view of a configuration of a battery device illustrated in FIG. 1.
Figure 3:
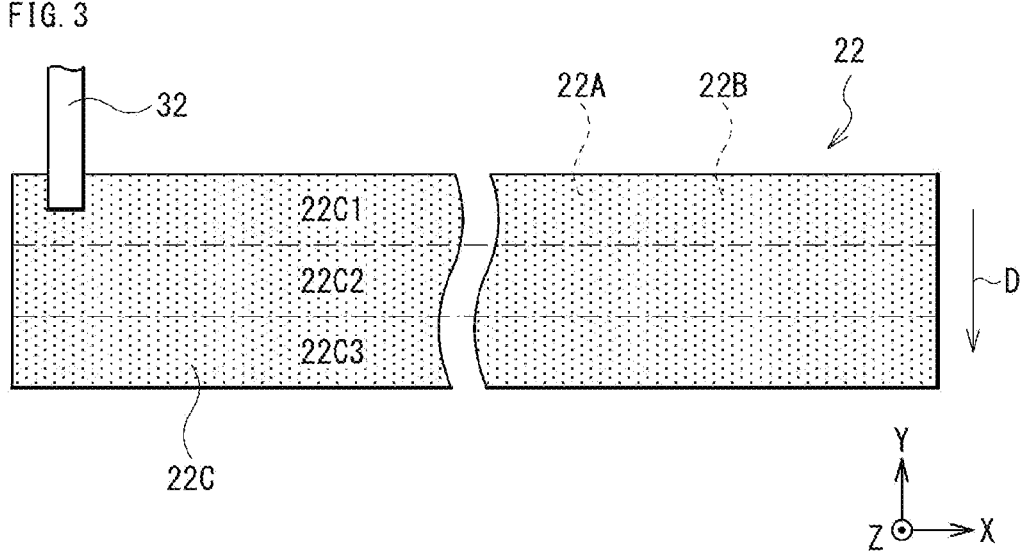
FIG. 3 is a plan view of a configuration of a negative electrode illustrated in FIG. 2.

FIG. 1 illustrates a perspective configuration of the secondary battery. FIG. 2 illustrates a sectional configuration of a battery device 20 illustrated in FIG. 1. FIG. 3 illustrates a planar configuration of a negative electrode 22 illustrated in FIG. 2.

Note that FIG. 1 illustrates a state in which an outer package film 10 and the battery device 20 are separated away from each other, and a section of the battery device 20 along an XZ plane is indicated by a dashed line. FIG. 2 illustrates only a portion of the battery device 20. FIG. 3 illustrates a state in which a negative electrode lead 32 is coupled to the negative electrode 22.

As illustrated in FIGS. 1 to 3, the secondary battery includes the outer package film 10, the battery device 20, a positive electrode lead 31, the negative electrode lead 32, and sealing films 41 and 42. The secondary battery described here is a secondary battery of a laminated-film type in which the outer package film 10 having flexibility or softness is used.

As illustrated in FIG. 1, the outer package film 10 is a flexible outer package member that contains the battery device 20. The outer package film 10 has a pouch-shaped structure in which the battery device 20 is sealed in a state of being contained inside the outer package film 10. The outer package film 10 thus contains a positive electrode 21, the negative electrode 22, and an electrolytic solution that are to be described later.

Here, the outer package film 10 is a single film-shaped member and is foldable toward a folding direction F. The outer package film 10 has a depression part 10U to place the battery device 20 therein. The depression part 10U is a so-called deep drawn part.

Specifically, the outer package film 10 is a three-layered laminated film including a fusion-bonding layer, a metal layer, and a surface protective layer that are stacked in this order from an inner side. In a state in which the outer package film 10 is folded, outer edge parts of the fusion-bonding layer opposed to each other are fusion-bonded to each other. The fusion-bonding layer includes a polymer compound such as polypropylene. The metal layer includes a metal material such as aluminum. The surface protective layer includes a polymer compound such as nylon.

Note that the outer package film 10 is not particularly limited in configuration or the number of layers, and may be single-layered or two-layered, or may include four or more layers. Further, in a case where the outer package film 10 is a multilayered laminated film, a material included in each layer may be selected as desired.

The sealing film 41 is interposed between the outer package film 10 and the positive electrode lead 31. The sealing film 42 is interposed between the outer package film 10 and the negative electrode lead 32. Note that the sealing film 41, the sealing film 42, or both may be omitted.

The sealing film 41 is a sealing member that prevents entry, for example, of outside air into the outer package film 10. The sealing film 41 includes a polymer compound such as a polyolefin that has adherence to the positive electrode lead 31. Examples of the polyolefin include polypropylene.

A configuration of the sealing film 42 is similar to that of the sealing film 41 except that the sealing film 42 is a sealing member that has adherence to the negative electrode lead 32. That is, the sealing film 42 includes a polymer compound such as a polyolefin that has adherence to the negative electrode lead 32.

As illustrated in FIGS. 1 to 3, the battery device 20 is a power generation device that includes the positive electrode 21, the negative electrode 22, a separator 23, and the electrolytic solution (not illustrated). The battery device 20 is contained inside the outer package film 10.

Here, the battery device 20 is a so-called wound electrode body. That is, in the battery device 20, the positive electrode 21 and the negative electrode 22 are stacked on each other with the separator 23 interposed therebetween, and the positive electrode 21, the negative electrode 22, and the separator 23 are wound about a winding axis P. The winding axis P is a virtual axis extending in a Y-axis direction. Thus, the positive electrode 21 and the negative electrode 22 are opposed to each other with the separator 23 interposed therebetween, and are wound.

A three-dimensional shape of the battery device 20 is not particularly limited. Here, the battery device 20 has an elongated shape. Accordingly, a section of the battery device 20 intersecting the winding axis P, that is, a section of the battery device 20 along the XZ plane, has an elongated shape defined by a major axis J1 and a minor axis J2. The major axis J1 is a virtual axis that extends in an X-axis direction and has a larger length than the minor axis J2. The minor axis J2 is a virtual axis that extends in a Z-axis direction intersecting the X-axis direction and has a smaller length than the major axis J1. Here, the battery device 20 has an elongated cylindrical three-dimensional shape. Thus, the section of the battery device 20 has an elongated, generally elliptical shape.

The positive electrode 21 includes, as illustrated in FIG. 2, a positive electrode current collector 21A and a positive electrode active material layer 21B.

The positive electrode current collector 21A has two opposed surfaces on which the respective positive electrode active material layers 21B are to be provided, and supports the positive electrode active material layers 21B. The positive electrode current collector 21A includes an electrically conductive material such as a metal material. Examples of the metal material include aluminum.

Here, the positive electrode active material layer 21B is provided on each of the two opposed surfaces of the positive electrode current collector 21A. The positive electrode active material layer 21B includes one or more of positive electrode active materials into which lithium is insertable and from which lithium is extractable. Note that the positive electrode active material layer 21B may be provided only on one of the two opposed surfaces of the positive electrode current collector 21A. Further, the positive electrode active material layer 21B may further include one or more of other materials including, without limitation, a positive electrode binder and a positive electrode conductor. A method of forming the positive electrode active material layer 21B is not particularly limited, and specifically includes one or more of methods including, without limitation, a coating method.

The positive electrode active material is not particularly limited in kind, and specific examples thereof include a lithium-containing compound. The lithium-containing compound is a compound including lithium and one or more transition metal elements as constituent elements. The lithium-containing compound may further include one or more other elements as a constituent element or constituent elements. The one or more other elements are not particularly limited in kind as long as the one or more other elements are each an element other than lithium and the transition metal elements. Specifically, the one or more other elements are any one or more of elements belonging to groups 2 to 15 in the long period periodic table of elements. The lithium-containing compound is not particularly limited in kind, and specific examples thereof include an oxide, a phosphoric acid compound, a silicic acid compound, and a boric acid compound.

Specific examples of the oxide include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, $Li_{1.15}(Mn_{0.65}Ni_{0.22}Co_{0.13})O_2$, and $LiMn_2O_4$. Specific examples of the phosphoric acid compound include $LiFePO_4$, $LiMnPO_4$, $LiFe_{0.5}Mn_{0.5}PO_4$, and $LiFe_{0.3}Mn_{0.7}PO_4$.

The positive electrode binder includes one or more of materials including, without limitation, a synthetic rubber and a polymer compound. Examples of the synthetic rubber include a styrene-butadiene-based rubber, a fluorine-based rubber, and ethylene propylene diene. Examples of the polymer compound include polyvinylidene difluoride, polyimide, and carboxymethyl cellulose.

The positive electrode conductor includes one or more of electrically conductive materials including, without limitation, a carbon material. Examples of the carbon material include graphite, carbon black, acetylene black, and Ketjen black. The electrically conductive material may be a metal material or a polymer compound, for example.

The negative electrode 22 includes, as illustrated in FIG. 2, a negative electrode current collector 22A, a negative electrode active material layer 22B, and a film 22C.

The negative electrode current collector 22A has two opposed surfaces on which the respective negative electrode active material layers 22B are to be disposed, and supports the negative electrode active material layers 22B. The negative electrode current collector 22A includes an electrically conductive material such as a metal material. Examples of the metal material include copper.

Here, the negative electrode active material layer 22B is provided on each of the two opposed surfaces of the negative electrode current collector 22A. The negative electrode active material layer 22B includes one or more of negative electrode active materials into which lithium is insertable and from which lithium is extractable. Note that the negative electrode active material layer 22B may be provided only on one of the two opposed surfaces of the negative electrode current collector 22A. Further, the negative electrode active material layer 22B may further include one or more of materials including, without limitation, a negative electrode binder and a negative electrode conductor. A method of forming the negative electrode active material layer 22B is not particularly limited, and specifically includes one or more of methods including, without limitation, a coating method, a vapor-phase method, a liquid-phase method, a thermal spraying method, and a firing (sintering) method.

The negative electrode active material is not particularly limited in kind, and specifically includes a carbon material, a metal-based material, or both, for example. A reason for this is that a high energy density is obtainable. Specific examples of the carbon material include graphitizable carbon, non-graphitizable carbon, and graphite (natural graphite and artificial graphite). The term "metal-based material" is a generic term for a material that includes, as a constituent element or constituent elements, one or more elements among metal elements and metalloid elements that are each able to form an alloy with lithium. Examples of such metal elements and metalloid elements include silicon, tin, or both. The metal-based material may be a simple substance, an alloy, a compound, a mixture of two or more thereof, or a material including two or more phases thereof. Specific examples of the metal-based material include $TiSi_2$ and $SiO_x$ ($0<x\leq 2$ or $0.2<x<1.4$).

Details of the negative electrode binder are similar to those of the positive electrode binder. Details of the negative electrode conductor are similar to those of the positive electrode conductor.

The film 22C covers a surface of the negative electrode active material layer 22B. In this case, the film 22C may cover the entire surface of the negative electrode active material layer 22B, or may cover only a portion of the surface of the negative electrode active material layer 22B. Note that, in the latter case, multiple films 22C may cover the surface of the negative electrode active material layer 22B at respective locations separate from each other. FIG. 2 illustrates a case where the film 22C covers the entire surface of the negative electrode active material layer 22B.

As will be described later, the film 22C is formed on the surface of each of the negative electrode active material layers 22B through a stabilization treatment (a first charge and discharge treatment) on the secondary battery after being assembled in a process of manufacturing the secondary battery, and includes sulfur as a constituent element.

Here, as will be described later, the electrolytic solution includes a sulfur-containing compound. The sulfur-containing compound in the electrolytic solution decomposes and reacts upon the stabilization treatment, and the film 22C therefore includes, as a constituent element, sulfur derived from the sulfur-containing compound. The term "sulfur-containing compound" is a generic term for a compound including sulfur as a constituent element, and is a substance to be a source of sulfur. Details of the sulfur-containing compound will be described later.

In the secondary battery, predetermined physical property conditions are satisfied regarding the film 22C, in order to improve each of an electric resistance characteristic and a cyclability characteristic. Details of the physical property of the film 22C will be described later.

The separator 23 is an insulating porous film interposed between the positive electrode 21 and the negative electrode 22 as illustrated in FIG. 2, and allows lithium ions to pass therethrough while preventing contact (a short circuit) between the positive electrode 21 and the negative electrode 22. The separator 23 includes a polymer compound such as polyethylene.

The positive electrode 21, the negative electrode 22, and the separator 23 are each impregnated with the electrolytic solution. The electrolytic solution includes a solvent and an electrolyte salt.

The solvent includes one or more of chain carboxylic acid esters each of which is a non-aqueous solvent (an organic solvent). A reason for this is that the chain carboxylic acid ester has low viscosity and an ionic conductivity (a lithium-ion conductive property) of the electrolytic solution thus improves. As a result, a charge and discharge characteristic at a high rate (a large charging current and a large discharging current) is improved, and a battery capacity is thus prevented from decreasing easily even if the secondary battery is charged and discharged at a high rate. An electrolytic solution including a non-aqueous solvent (a chain carboxylic acid ester) is a so-called non-aqueous electrolytic solution.

The chain carboxylic acid ester is not particularly limited in kind, and specific examples thereof include methyl acetate, ethyl acetate, propyl acetate, methyl propionate, ethyl propionate, propyl propionate, isopropyl propionate, methyl butyrate, ethyl butyrate, and ethyl isobutyrate. A reason for this is that the ionic conductivity of the electrolytic solution sufficiently improves. A content of the chain carboxylic acid ester in the solvent is not particularly limited, and is specifically greater than or equal to 30 vol %. A reason for this is that the ionic conductivity of the electrolytic solution further improves.

In particular, the chain carboxylic acid ester preferably includes ethyl acetate, propyl acetate, ethyl propionate, and propyl propionate. A reason for this is that the ionic conductivity of the electrolytic solution further improves.

The solvent may further include one or more of other non-aqueous solvents. The other non-aqueous solvent is not particularly limited in kind, and specific examples thereof include a carbonic-acid-ester-based compound and a lactone-based compound. Examples of the carbonic-acid-ester-based compound include a cyclic carbonic acid ester and a chain carbonic acid ester. Examples of the lactone-based compound include a lactone.

Note that the solvent may include one or more of the sulfur-containing compounds. A reason for this is that it becomes easier to form, on the surface of the negative electrode active material layer 22B, the film 22C that includes sulfur as a constituent element due to the decomposition and the reaction of the sulfur-containing compound upon the stabilization treatment of the secondary battery. Further, even if a portion of the film 22C is decomposed upon charging and discharging, it becomes easier to additionally form the film 22C due to decomposition and a reaction of the sulfur-containing compound at a subsequent cycle of charging and discharging.

As described above, the sulfur-containing compound is a substance to be a source of sulfur, that is, a compound including sulfur as a constituent element. The sulfur-containing compound may be a cyclic compound or a chain compound. Further, the sulfur-containing compound may include a carbon-carbon double bond, a carbon-carbon triple bond, or both. The carbon-carbon double bond and the carbon-carbon triple bond are each an unsaturated carbon bond.

The sulfur-containing compound is not particularly limited in kind, and specific examples thereof include a cyclic sulfonic acid ester, a chain sulfonic acid ester, a cyclic disulfonic acid anhydride, and a cyclic sulfonic acid carboxylic acid anhydride. A reason for this is that it becomes sufficiently easier to form the film 22C on the surface of the negative electrode active material layer 22B. A content of the sulfur-containing compound in the electrolytic solution is not particularly limited, and may thus be set as desired.

Specific examples of the cyclic sulfonic acid ester include propane sultone (1,3-propane sultone), propene sultone (1-propene 1,3-sultone), 4-methyl-1,3,2-dioxathiolane 2,2-dioxide, and 1,3,2-dioxathiolane 2,2-dioxide.

Specific examples of the chain sulfonic acid ester include propargyl methanesulfonate, propargyl ethanesulfonate, and 2-propynyl benzenesulfonate.

Examples of the cyclic disulfonic acid anhydride include an ethane disulfonic acid anhydride and a propane disulfonic acid anhydride.

Specific examples of the cyclic sulfonic acid carboxylic acid anhydride include a sulfobenzoic acid anhydride, a sulfopropionic acid anhydride, and a sulfobutyric acid anhydride.

The electrolyte salt includes one or more of light metal salts including, without limitation, a lithium salt. A content of the electrolyte salt in the electrolytic solution is not particularly limited, and may thus be set as desired.

[Positive Electrode Lead and Negative Electrode Lead]

As illustrated in FIG. 1, the positive electrode lead 31 is a positive electrode wiring line coupled to the battery device 20 (the positive electrode 21), and is led from an inside to an outside of the outer package film 10. The positive electrode lead 31 includes an electrically conductive material such as aluminum. The positive electrode lead 31 has a shape such as a thin plate shape or a meshed shape.

As illustrated in FIGS. 1 and 3, the negative electrode lead 32 is a negative electrode wiring line coupled to the battery device 20 (the negative electrode 22). Details of a state of coupling between the negative electrode 22 and the negative electrode lead 32 will be described later. Here, the negative electrode lead 32 is led from the inside to the outside of the outer package film 10 toward a direction similar to that in which the positive electrode lead 31 is led out. The negative electrode lead 32 includes an electrically conductive material such as copper. Details of a shape of the negative electrode lead 32 are similar to those of the shape of the positive electrode lead 31.

In the secondary battery, as described above, the predetermined physical property conditions are satisfied regarding the film 22C that includes sulfur as a constituent element, in order to improve each of the electric resistance characteristic and the cyclability characteristic. In the following, the state of coupling between the negative electrode 22 and the negative electrode lead 32 will be described first, following which the physical property conditions of the film 22C will be described. In those cases, where appropriate, reference is made to FIGS. 2 and 3 which have already been described.

As illustrated in FIG. 2, the negative electrode 22 includes the negative electrode current collector 22A, the negative electrode active material layer 22B, and the film 22C.

In this case, as illustrated in FIG. 3, the negative electrode current collector 22A has a band shape extending in a length direction (the X-axis direction). Here, the negative electrode active material layer 22B is provided on the entire surface of the negative electrode current collector 22A, and the film 22C covers the entire surface of the negative electrode active material layer 22B. In FIG. 3, the film 22C is shaded.

Here, the negative electrode lead 32 is provided separately from the negative electrode 22 (the negative electrode current collector 22A). The negative electrode lead 32 extends in a width direction (the Y-axis direction) intersecting the length direction, and a portion of the negative electrode lead 32 is coupled to the negative electrode 22, in order to make an area coupled to the negative electrode 22 sufficiently small within an allowable range. Accordingly, one end part of the negative electrode lead 32 overlaps with one end part of the negative electrode 22 in the width direction, and is thus coupled to the one end part of the negative electrode 22. Note that another end part of the negative electrode lead 32 does not overlap with the one end part of the negative electrode 22, and protrudes outward relative to the negative electrode 22 (the negative electrode active material layer 22B).

In a region in which the negative electrode 22 and the negative electrode lead 32 overlap with each other, neither the negative electrode active material layer 22B nor the film 22C is provided on the surface of the negative electrode current collector 22A. The negative electrode current collector 22A in the region is thus exposed. In this manner, the negative electrode lead 32 is coupled to the negative electrode current collector 22A.

In the battery device 20 which is the wound electrode body, a position where the negative electrode lead 32 is coupled to the negative electrode 22 is not particularly limited. In other words, in a case where the negative electrode 22 is wound, the negative electrode lead 32 may be coupled to the negative electrode 22 on an outer side of winding, may be coupled to the negative electrode 22 on an inner side of the winding, or may be coupled to the negative electrode 22 in the middle between the outer side of the winding and the inner side of the winding. In FIG. 3, the right side represents the outer side of the winding and the left side represents the inner side of the winding. Accordingly, FIG. 3 illustrates a case where the negative electrode lead 32 is coupled to the negative electrode 22 on the inner side of the winding.

On the basis of the position of the negative electrode lead 32 coupled to the negative electrode 22, the film 22C is divided into thirds in a direction away from the negative electrode lead 32 (i.e., a direction D along the width direction). The film 22C is thus divided into a film part 22C1 which is a first film part, a film part 22C2 which is a second film part, and a film part 22C3 which is a third film part. In this case, all of the following three physical property conditions are satisfied.

(Physical Property Condition 1)

A content X ($\mu mol/m^2$) of sulfur in the film part 22C1, the film part 22C3, or each of the film parts 22C1 and 22C3 is within a range from 11 $\mu mol/m^2$ to 22 $\mu mol/m^2$ both inclusive. Out of the film parts 22C1 to 22C3, the film part 22C1 and the film part 22C3 are opposite end parts in the width direction.

In other words, the physical property condition 1 may be as follows: the content X of sulfur in the film part 22C1 is within the range from 11 $\mu mol/m^2$ to 22 $\mu mol/m^2$ both inclusive; the content X of sulfur in the film part 22C3 is within the range from 11 $\mu mol/m^2$ to 22 $\mu mol/m^2$ both inclusive; or the content X of sulfur in each of the film parts 22C1 and 22C3 is within the range from 11 $\mu mol/m^2$ to 22 $\mu mol/m^2$ both inclusive.

The content X is adjustable to a desired value by changing conditions including, without limitation, a heating temperature, a heating time, and an aging time after heating when a portion (the film part 22C1, the film part 22C3, or each of the film parts 22C1 and 22C3) of the battery device 20 is heated upon the stabilization treatment of the assembled secondary battery, as will be described later. Further, the content X is also adjustable to a desired value by changing the content of the sulfur-containing compound in the electrolytic solution.

(Physical Property Condition 2)

A content Y ($\mu mol/m^2$) of sulfur in the film part 22C2 is within a range from 7 $\mu mol/m^2$ to 13 $\mu mol/m^2$ both inclusive. Out of the film parts 22C1 to 22C3, the film part 22C2 is a middle part in the width direction.

The content Y is adjustable to a desired value by changing the content of the sulfur-containing compound in the electrolytic solution. Further, similarly to the case of adjusting the content X, the content Y is also adjustable to a desired value by heating a portion (the film part 22C2) of the battery device 20 upon the stabilization treatment of the secondary battery.

(Physical Property Condition 3)

A content ratio Z that is a ratio of the content X to the content Y is within a range from 1.2 to 2.1 both inclusive. The content ratio Z is calculated on the basis of the following calculation expression: content ratio Z=content X/content Y.

All of the physical property conditions 1 to 3 are satisfied. Therefore, in the negative electrode 22 including the film 22C, an amount of the film 22C provided in the opposite end parts (the film parts 22C1 and 22C3) in the width direction, i.e., the content X, is larger than an amount of the film 22C provided in the middle part (the film part 22C2) in the width direction, i.e., the content Y. In this case, the content ratio Z is made appropriate to be within the range from 1.2 to 2.1 both inclusive.

A reason why all of the physical property conditions 1 to 3 are satisfied is that, as will be described later, in a case where the electrolytic solution includes the chain carboxylic acid ester, distribution of the amount of the film 22C provided in the negative electrode 22 is made appropriate. This suppresses an increase in electric resistance and improves the lithium-ion conductive property in the negative electrode 22. Thus, the suppression of the increase in the electric resistance and the improvement in the ion conductivity are both achieved. Details of the reason described here will be described later.

The film 22C is analyzed by inductively coupled plasma (ICP) optical emission spectroscopy, and the contents X and Y are thereby each calculated on the basis of a result of the analysis. The content ratio Z is measured on the basis of respective results of the calculations regarding the contents X and Y.

A specific procedure of calculating each of the contents X and Y and the content ratio Z is as described below.

First, the secondary battery is discharged until a voltage reaches 3 V. A current at the time of the discharge is not particularly limited and may thus be set as desired. Thereafter, the secondary battery after the discharge is disassembled to thereby collect the negative electrode 22. Thereafter, the negative electrode 22 is washed with a washing solvent. Although not particularly limited in kind, the washing solvent is specifically an organic solvent such as dimethyl carbonate. Thereafter, the negative electrode 22 is punched into a disk shape (having a diameter of 19 mm) to thereby obtain a sample for analysis.

Thereafter, the sample (the film 22C) is analyzed by means of an ICP optical emission spectrometer. In this case, the film part 22C1, the film part 22C3, or both are analyzed to thereby measure the content ($\mu g$) of sulfur included in the film part 22C1, the film part 22C3, or each of the film parts 22C1 and 22C3. As the ICP optical emission spectrometer, for example, SPS 3500, a sequential-type ICP optical emission spectrometer available from Hitachi High-Tech Science Corporation (formerly: SII Nanotechnology Inc.) is usable. Thereafter, the content X ($\mu mol/m^2$) is calculated on the basis of the content (a value obtained by converting $\mu g$ into $\mu mol$) of the sulfur described above and an area ($m^2$) of the sample.

Thereafter, the content Y ($\mu$mol/m$^2$) is calculated by a similar procedure except that the film part 22C2 is analyzed instead of the film part 22C1, the film part 22C3, or both.

Lastly, the content ratio Z (=content X/content Y) is calculated on the basis of the contents X and Y. In this manner, the contents X and Y and the content ratio Z are each calculated on the basis of the analysis result on the film 22C obtained by ICP optical emission spectroscopy.

Upon charging the secondary battery, in the battery device 20, lithium is extracted from the positive electrode 21, and the extracted lithium is inserted into the negative electrode 22 via the electrolytic solution. Upon discharging the secondary battery, in the battery device 20, lithium is extracted from the negative electrode 22, and the extracted lithium is inserted into the positive electrode 21 via the electrolytic solution. Upon charging and discharging, lithium is inserted and extracted in an ionic state.

The secondary battery is manufactured according to a procedure to be described below. In this case, as will be described later, the secondary battery is assembled using the positive electrode 21, a negative electrode precursor, and the electrolytic solution, following which the stabilization treatment is performed on the assembled secondary battery.

Figure 4:
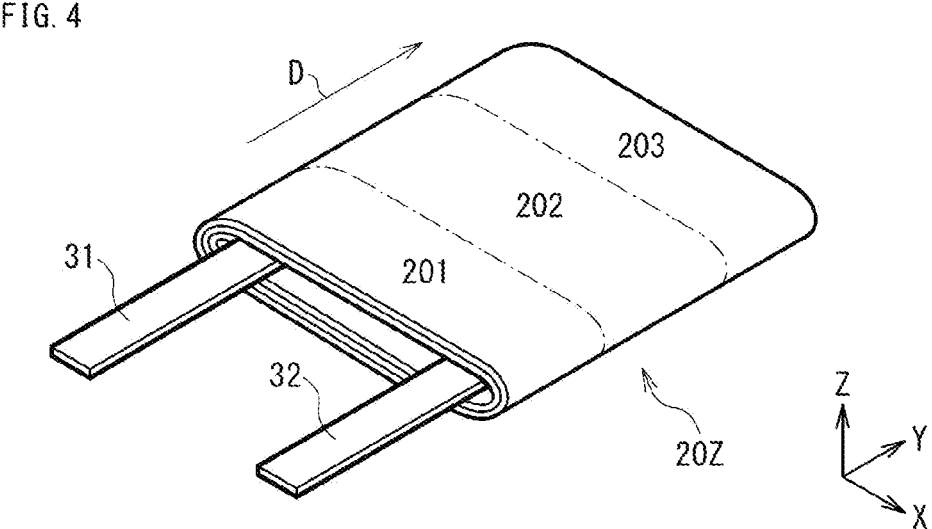
FIG. 4 is a perspective view for describing a process of manufacturing (a stabilization treatment to be performed on) the secondary battery according to an embodiment.

FIG. 4 illustrates a perspective configuration corresponding to FIG. 1 for describing the process of manufacturing (the stabilization treatment to be performed on) the secondary battery. FIG. 4 omits illustration of the outer package film 10 and the sealing films 41 and 42 for easy understanding of a heating region of the wound body 20Z.

The positive electrode active material is mixed with materials including, without limitation, the positive electrode binder and the positive electrode conductor on an as-needed basis to thereby obtain a positive electrode mixture. Thereafter, the positive electrode mixture is put into the solvent to thereby prepare a paste positive electrode mixture slurry. The solvent may be an aqueous solvent, or may be a non-aqueous solvent (an organic solvent). Thereafter, the positive electrode mixture slurry is applied on the two opposed surfaces of the positive electrode current collector 21A to thereby form the positive electrode active material layers 21B. Thereafter, the positive electrode active material layers 21B may be compression-molded by means of, for example, a roll pressing machine. In this case, the positive electrode active material layers 21B may be heated. The positive electrode active material layers 21B may be compression-molded multiple times. In this manner, the positive electrode active material layers 21B are formed on the respective two opposed surfaces of the positive electrode current collector 21A. Thus, the positive electrode 21 is fabricated.

The negative electrode active material layers 22B are formed on the respective two opposed surfaces of the negative electrode current collector 22A by a procedure similar to the fabrication procedure of the positive electrode 21 described above. Specifically, the negative electrode active material is mixed with materials including, without limitation, the negative electrode binder and the negative electrode conductor on an as-needed basis to thereby obtain a negative electrode mixture. Thereafter, the negative electrode mixture is put into the solvent to thereby prepare a paste negative electrode mixture slurry. Details of the solvent are as described above. Thereafter, the negative electrode mixture slurry is applied on the two opposed surfaces of the negative electrode current collector 22A to thereby form the negative electrode active material layers 22B. Thereafter, the negative electrode active material layers 22B may be compression-molded. In this manner, the negative electrode active material layers 22B are formed on the respective two opposed surfaces of the negative electrode current collector 22A. Thus, the negative electrode precursor (not illustrated) is fabricated.

Lastly, as will be described later, the secondary battery is assembled using the negative electrode precursor, following which the stabilization treatment is performed on the assembled secondary battery. As a result, the film 22C including sulfur as a constituent element is formed on the surface of each of the negative electrode active material layers 22B. In this manner, the negative electrode active material layers 22B and the films 22C are formed on the respective two opposed surfaces of the negative electrode current collector 22A. Thus, the negative electrode 22 is fabricated.

The electrolyte salt is put into the solvent, following which the sulfur-containing compound is added to the solvent. The solvent is not particularly limited in kind, and specific examples thereof include a non-aqueous solvent (an organic solvent). The electrolyte salt and the sulfur-containing compound are thereby each dispersed or dissolved in the solvent. As a result, the electrolytic solution is prepared.

First, the positive electrode lead 31 is coupled to the positive electrode precursor (the positive electrode current collector 21A) by a method such as a welding method, and the negative electrode lead 32 is coupled to the negative electrode precursor (the negative electrode current collector 22A) by a method such as a welding method.

Thereafter, the positive electrode 21 and the negative electrode precursor are stacked on each other with the separator 23 interposed therebetween, following which the stack of the positive electrode 21, the negative electrode precursor, and the separator 23 is wound to thereby fabricate a wound body 20Z, as illustrated in FIG. 4. The wound body 20Z has a configuration similar to that of the battery device 20 except that the wound body 20Z includes the negative electrode precursor instead of the negative electrode 22, and that the positive electrode 21, the negative electrode precursor, and the separator 23 are each not impregnated with the electrolytic solution. Thereafter, the wound body 20Z is pressed by means of, for example, a pressing machine to thereby shape the wound body 20Z into an elongated shape.

Thereafter, the wound body 20Z is placed inside the depression part 10U, following which the outer package film 10 (the fusion-bonding layer/the metal layer/the surface protective layer) is folded to thereby cause portions of the outer package film 10 to be opposed to each other. Thereafter, outer edge parts of two sides of the outer package film 10 (the fusion-bonding layer) opposed to each other are fusion-bonded to each other by a method such as a thermal-fusion-bonding method to thereby contain the wound body 20Z in the outer package film 10 having the pouch shape.

Lastly, the electrolytic solution is injected into the outer package film 10 having the pouch shape, following which the outer edge parts of the remaining one side of the outer package film 10 (the fusion-bonding layer) are fusion-bonded to each other by a method such as a thermal-fusion-bonding method. In this case, the sealing film 41 is interposed between the outer package film 10 and the positive electrode lead 31, and the sealing film 42 is interposed between the outer package film 10 and the negative electrode lead 32. The wound body 20Z is thereby impregnated with the electrolytic solution. In this manner, the wound body 20Z is sealed in the outer package film 10 having the pouch shape. As a result, the secondary battery is assembled.

The assembled secondary battery is charged and discharged. Conditions including, for example, an environment temperature, the number of times of charging and discharging (the number of cycles), and charging and discharging conditions may be set as desired. As a result, the sulfur-containing compound in the electrolytic solution decomposes and reacts, and the film 22C including sulfur as a constituent element is formed on the surface of each of the negative electrode active material layers 22B. In this manner, the negative electrode active material layers 22B and the films 22C are formed on the respective two opposed surfaces of the negative electrode current collector 22A. Thus, the negative electrode 22 is fabricated. As a result, the battery device 20 is fabricated.

In this case, a portion of the wound body 20Z is heated by a heating device such as a heater. Specifically, as illustrated in FIGS. 3 and 4, the wound body 20Z includes a wound part 201 corresponding to the film part 22C1, a wound part 202 corresponding to the film part 22C2, and a wound part 203 corresponding to the film part 22C3. The wound part 201, the wound part 203, or both of the wound body 20Z are heated. Heating conditions are not particularly limited. Specifically, a heating temperature is from 60° C. to 80° C. both inclusive and a heating time is from 1 hour to 24 hours both inclusive.

The heating treatment increases the amount of the film 22C formed in the wound part 201, the wound part 203, or each of the wound parts 201 and 203. In contrast, the amount of the film 22C formed in the wound part 202 where the heating treatment is not performed does not increase. In this case, changing the above-described heating conditions makes it possible to control each of the contents X and Y, which also makes it possible to control the content ratio Z.

This brings the assembled secondary battery into an electrochemically stable state. Thus, the secondary battery including the outer package film 10, that is, the secondary battery of the laminated-film type, is completed.

After the stabilization treatment of the secondary battery is completed, the secondary battery may be aged. Aging conditions are not particularly limited. Specifically, an aging temperature is from 60° C. to 80° C. both inclusive, and an aging time is from 6 hours to 48 hours both inclusive. Changing the aging conditions also makes it possible to control each of the contents X and Y, which therefore makes it possible to control the content ratio Z.

Further, after the stabilization treatment of the secondary battery is completed, that is, after the negative electrode 22 is fabricated (after the film 22C is formed on the surface of each of the negative electrode active material layers 22B), the sulfur-containing compound used for forming the film 22C may or may not remain in the electrolytic solution.

According to the secondary battery, the film 22C of the negative electrode 22 includes sulfur as a constituent element, and the electrolytic solution includes the chain carboxylic acid ester. Further, the film 22C (including the film parts 22C1 to 22C3) satisfies all of the physical property conditions 1 to 3 (the content X is within the range from 11 $\mu$mol/m$^2$ to 22 $\mu$mol/m$^2$ both inclusive, the content Y is within the range from 7 $\mu$mol/m$^2$ to 13 $\mu$mol/m$^2$ both inclusive, and the content ratio Z is within the range from 1.2 to 2.1 both inclusive). Accordingly, it is possible to achieve a superior electric resistance characteristic and a superior cyclability characteristic for reasons to be described below.

In more detail, the electrolytic solution includes the chain carboxylic acid ester that is a low-viscosity solvent, and this improves the lithium-ion conductive property of the electrolytic solution. As a result, it becomes easier for the lithium ions to be inserted into and extracted from the negative electrode 22 upon charging and discharging. This improves the cyclability characteristic, and in particular, it is possible to achieve a superior cyclability characteristic even if the secondary battery is charged and discharged at a high rate.

However, the chain carboxylic acid ester that is the low-viscosity solvent is highly volatile. Thus, the chain carboxylic acid ester in the electrolytic solution easily volatilizes during long-term use (during long-term storage) of the secondary battery. This tendency of the chain carboxylic acid ester to volatilize is particularly apparent in the opposite end parts (the film parts 22C1 and 22C3) that are easily exposed to outside air as compared with in the middle part (the film part 22C2) that is less easily exposed to the outside air in the negative electrode 22. In other words, an amount of volatilization of the chain carboxylic acid ester in each of the film parts 22C1 and 22C3 is greater than an amount of volatilization of the chain carboxylic acid ester in the film part 22C2.

Volatilization of the chain carboxylic acid ester in each of the film parts 22C1 and 22C3 increases viscosity of the electrolytic solution. As a result, the lithium-ion conductive property in the electrolytic solution lowers, which easily causes precipitation of a lithium metal on the surface of the negative electrode 22.

Here, in a case where the film 22C including sulfur as a constituent element is provided on the surface of the negative electrode active material layer 22B, the surface of the negative electrode 22 is protected with use of the film 22C. This suppresses the precipitation of the lithium metal on the surface of the negative electrode 22. However, if the film 22C is provided on the surface of the negative electrode active material layer 22B, the precipitation of the lithium metal is suppressed, but the secondary battery (the negative electrode 22) is increased in internal resistance, which lowers the cyclability characteristic after all. In particular, the cyclability characteristic markedly lowers if the secondary battery is charged and discharged at a high rate.

Based upon the foregoing, in a case where the electrolytic solution includes the chain carboxylic acid ester but no film 22C is provided on the surface of the negative electrode active material layer 22B, the following trade-off relationship is exhibited. The electric resistance characteristic improves due to the absence of the film 22C, but the cyclability characteristic lowers due to the fact that the precipitation of the lithium metal occurs easily. In other words, improvement in one characteristic causes degradation in the other characteristic.

Further, in a case where the film 22C is provided on the surface of the negative electrode active material layer 22B but the electrolytic solution does not include the chain carboxylic acid ester, the following trade-off relationship is exhibited. The cyclability characteristic improves due to the fact that the precipitation of the lithium metal is prevented from occurring easily, but the electric resistance characteristic lowers due to the presence of the film 22C.

In contrast, in a case where the electrolytic solution includes the chain carboxylic acid ester and where the film 22C is provided on the surface of the negative electrode active material layer 22B, if all of the physical property conditions 1 to 3 are satisfied, the distribution of the amount of the provided film 22C is made appropriate, as described above. In other words, the amount of the film 22C provided in the film part 22C1, the film part 22C3, or each of the film parts 22C1 and 22C3 is appropriately larger than the amount of the film 22C provided in the film part 22C2.

In this case, in the film part 22C1, the film part 22C3, or both, the precipitation of the lithium metal is prevented from occurring easily due to the presence of the film parts 22C1 and 22C3, and this improves the cyclability characteristic. Moreover, in the film part 22C2, the electric resistance is prevented from increasing easily even if the film part 22C2 is present, and this improves the electric resistance characteristic.

Based upon the foregoing, in a case where all of the physical property conditions 1 to 3 are satisfied, the above-described trade-off relationship is overcome. Thus, an increase in the electric resistance is suppressed and the cyclability characteristic is improved. In this case, needless to say, a similar tendency is obtained even if the secondary battery is charged and discharged at a high rate. Accordingly, it is possible to achieve a superior electric resistance characteristic and a superior cyclability characteristic.

In particular, the chain carboxylic acid ester may include, for example, ethyl acetate. This sufficiently improves the ionic conductivity of the electrolytic solution. Accordingly, it is possible to achieve higher effects.

Further, the electrolytic solution may include the sulfur-containing compound. This makes it easier to form the film 22C including sulfur as a constituent element on the surface of the negative electrode active material layer 22B. Accordingly, it is possible to achieve higher effects. In this case, the electrolytic solution may include the sulfur-containing compound also after the stabilization treatment of the secondary battery (i.e., after the formation of the film 22C). This makes it easier to additionally form the film 22C upon charging and discharging after the stabilization treatment. Accordingly, it is possible to achieve further higher effects. Further, the sulfur-containing compound may include, for example, the cyclic sulfonic acid ester. This makes it easier to form the film 22C on the surface of the negative electrode active material layer 22B. Accordingly, it is possible to achieve further higher effects.

Further, the secondary battery may include a lithium-ion secondary battery. This makes it possible to obtain a sufficient battery capacity stably through the use of insertion and extraction of lithium. Accordingly, it is possible to achieve higher effects.

The configuration of the secondary battery is appropriately modifiable as described below according to an embodiment. Note that any two or more of the following series of modifications may be combined with each other.

In FIGS. 1 to 3, the secondary battery includes the battery device 20 which is the wound electrode body. However, as illustrated in FIGS. 5 to 7 respectively corresponding to FIGS. 1 to 3, the secondary battery may include a battery device 50 which is a stacked electrode body instead of the battery device 20 which is the wound electrode body.

Figure 5:
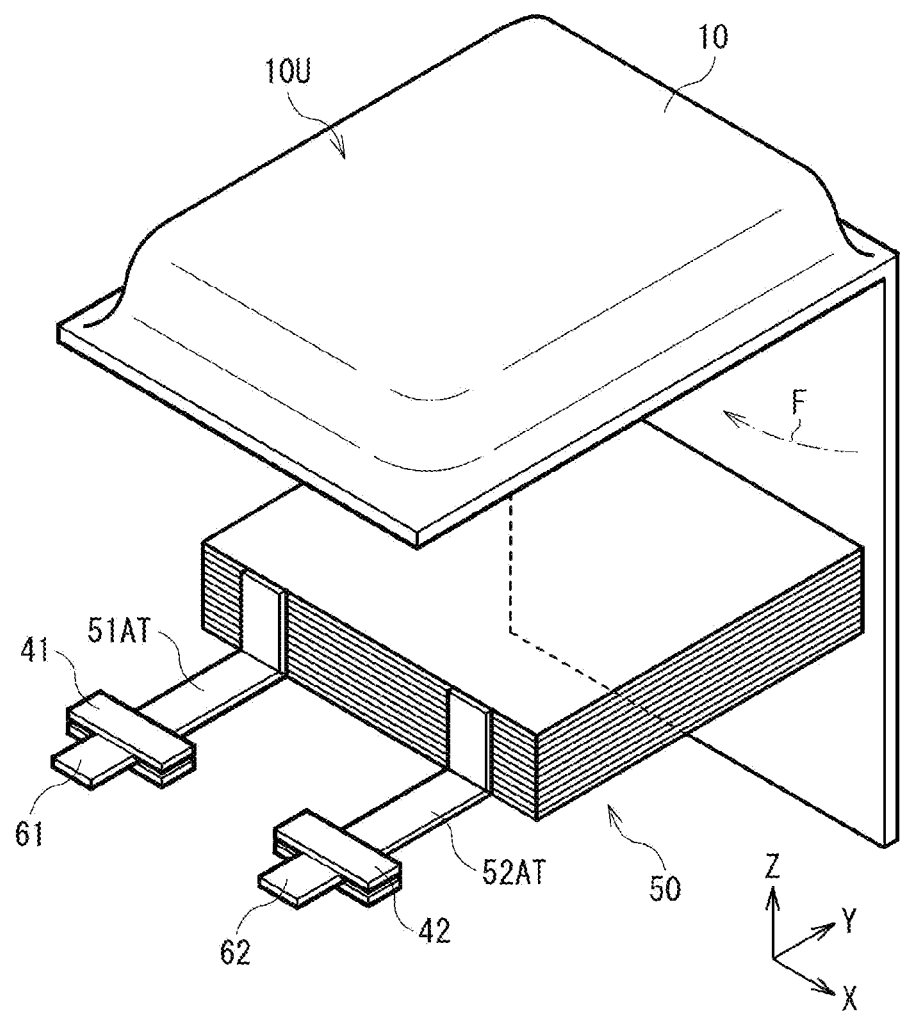
FIG. 5 is a perspective view of a configuration of a secondary battery according to an embodiment.
Figure 6:
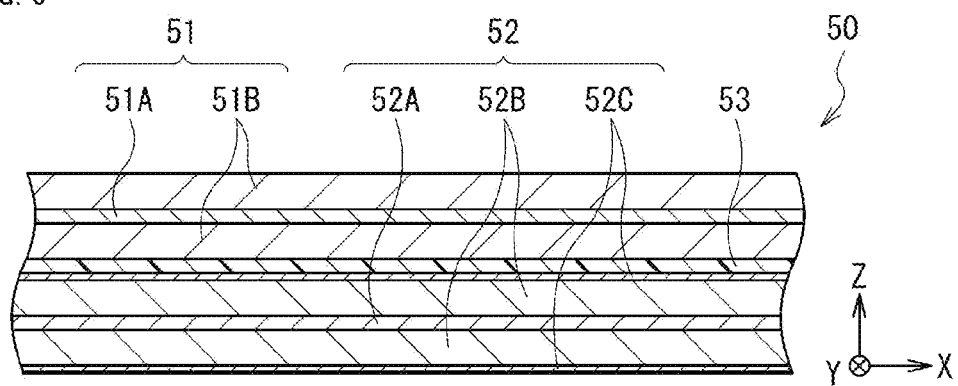
FIG. 6 is a sectional view of a configuration of a battery device illustrated in FIG. 5.
Figure 7:
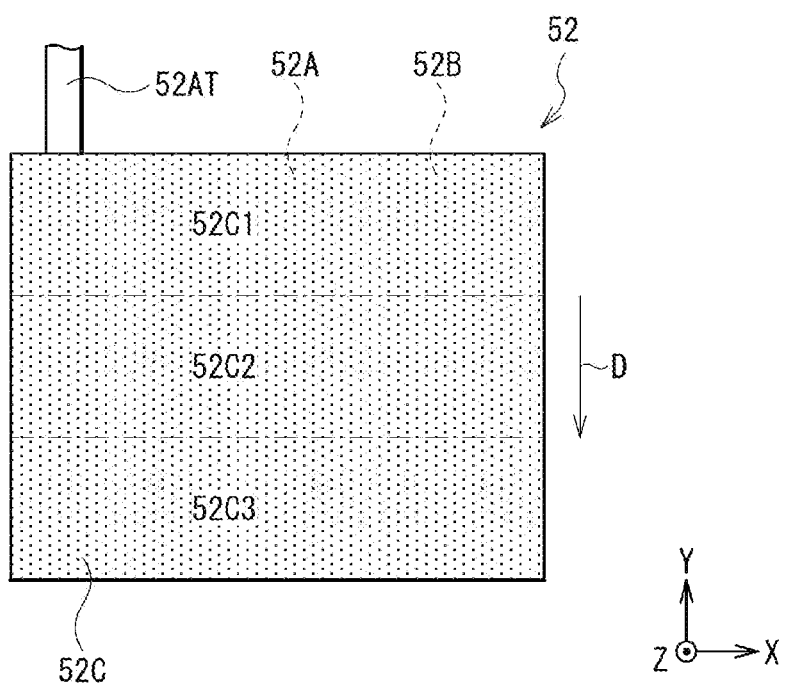
FIG. 7 is a plan view of a configuration of a negative electrode illustrated in FIG. 6.

A secondary battery of a laminated-film type illustrated in FIGS. 5 to 7 has a configuration similar to that of the secondary battery of the laminated-film type illustrated in FIGS. 1 to 3, except that the secondary battery of the laminated-film type illustrated in FIGS. 5 to 7 includes the battery device 50 (a positive electrode 51, a negative electrode 52, and a separator 53), a positive electrode lead 61, and a negative electrode lead 62, instead of the battery device 20 (the positive electrode 21, the negative electrode 22, and the separator 23), the positive electrode lead 31, and the negative electrode lead 32.

Respective configurations of the positive electrode 51, the negative electrode 52, and the separator 53 are similar to the respective configurations of the positive electrode 21, the negative electrode 22, and the separator 23 except for those described below.

In the battery device 50, the positive electrode 51 and the negative electrode 52 are alternately stacked on each other with the separator 53 interposed therebetween. The respective numbers of the positive electrodes 51, the negative electrodes 52, and the separators 53 to be stacked are not particularly limited. The positive electrode 51 includes a positive electrode current collector 51A and a positive electrode active material layer 51B respectively corresponding to the positive electrode current collector 21A and the positive electrode active material layer 21B. The negative electrode 52 includes a negative electrode current collector 52A, a negative electrode active material layer 52B, and a film 52C respectively corresponding to the negative electrode current collector 22A, the negative electrode active material layer 22B, and the film 22C. A configuration of the electrolytic solution is as described above.

Note that, as illustrated in FIGS. 5 and 7, the positive electrode current collector 51A and the negative electrode current collector 52A are each a sheet having a rectangular shape. The positive electrode current collector 51A includes a protruding part 51AT in which no positive electrode active material layer 51B is provided. The negative electrode current collector 52A includes a protruding part 52AT in which no negative electrode active material layer 52B is provided. The protruding part 52AT is disposed at a position which does not overlap with the protruding part 51AT. Multiple protruding parts 51AT are joined to each other to thereby form the positive electrode lead 61 which is a single positive electrode wiring line having a lead shape. Multiple protruding parts 52AT are joined to each other to thereby form the negative electrode lead 62 which is a single negative electrode wiring line having a lead shape. In other words, the positive electrode lead 61 coupled to the positive electrode 51 is integrated with the positive electrode current collector 51A, and the negative electrode lead 62 coupled to the negative electrode 52 is integrated with the negative electrode current collector 52A.

In the battery device 50 also, all of the physical property conditions 1 to 3 are satisfied as with the battery device 20 described above. Specifically, on the basis of a position of the negative electrode lead 62 coupled to the negative electrode 52, the film 52C is divided into thirds (film parts 52C1 to 52C3) in the direction D away from the negative electrode lead 62. In this case, the content X of sulfur in the film part 52C1, the film part 52C3, or each of the film parts 52C1 and 52C3 is within the range from 11 μmol/m$^2$ to 22 μmol/m$^2$ both inclusive (the physical property condition 1). The content Y of sulfur in the film part 52C2 is within the range from 7 μmol/m$^2$ to 13 μmol/m$^2$ both inclusive (the physical property condition 2). The content ratio Z that is the ratio of the content X to the content Y is within the range from 1.2 to 2.1 both inclusive (the physical property condition 3).

Figure 8:
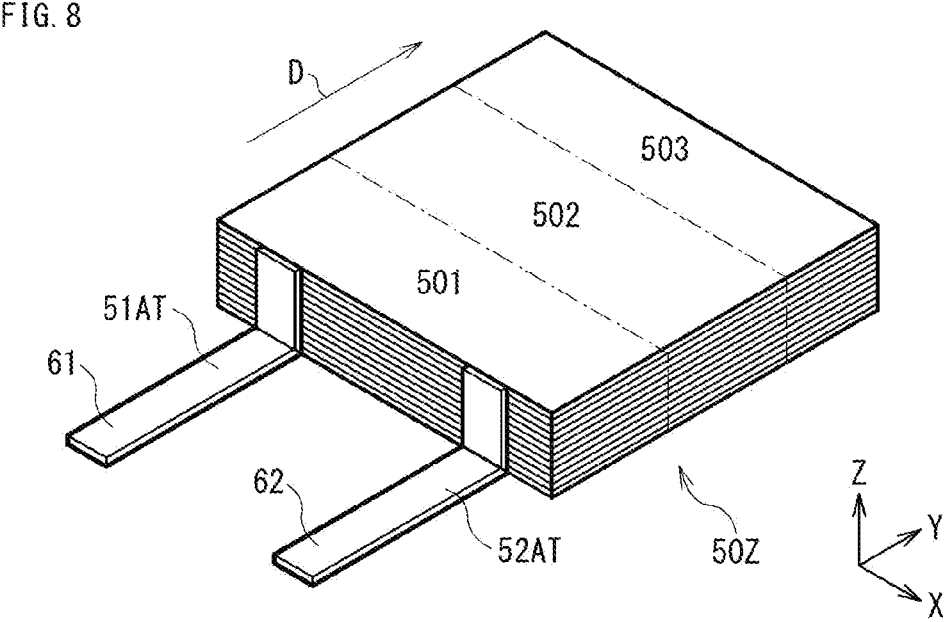
FIG. 8 is a perspective view for describing a process of manufacturing (a stabilization treatment to be performed on) the secondary battery according to an embodiment.

A method of manufacturing the secondary battery of the laminated-film type illustrated in FIGS. 5 to 7 is similar to the method of manufacturing the secondary battery of the laminated-film type illustrated in FIGS. 1 to 4, except that, as illustrated in FIG. 8 corresponding to FIG. 4, a stacked body 50Z is fabricated instead of the wound body 20Z, and the stabilization treatment is performed on the secondary battery which is assembled using the stacked body 50Z.

In a case of fabricating the battery device 50, first, the positive electrode 51 is fabricated in which the positive electrode active material layer 51B is provided on each of two opposed surfaces (excluding the protruding part 51AT) of the positive electrode current collector 51A, and the negative electrode 52 is fabricated in which the negative electrode active material layer 52B is provided on each of two opposed surfaces (excluding the protruding part 52AT)

of the negative electrode current collector 52A. Thereafter, the positive electrode 51 and the negative electrode 52 are alternately stacked on each other with the separator 53 interposed therebetween, to thereby form the stacked body 50Z, as illustrated in FIG. 8. Thereafter, the protruding parts 51AT are joined to each other by a method such as a welding method to thereby form the positive electrode lead 61, and the protruding parts 52AT are joined to each other by a method such as a welding method to thereby form the negative electrode lead 62.

In the stabilization treatment of the assembled secondary battery, a portion of the stacked body 50Z is heated by a heating device such as a heater. Specifically, as illustrated in FIG. 8, the stacked body 50Z includes a stacked part 501 corresponding to the film part 52C1, a stacked part 502 corresponding to the film part 52C2, and a stacked part 503 corresponding to the film part 52C3. The stacked part 501, the stacked part 503, or both of the stacked body 50Z are heated. The film 52C including sulfur as a constituent element is thereby formed on the surface of each of the negative electrode active material layers 52B. Thus, the negative electrode 52 is fabricated, and the battery device 50 is fabricated. In this case, changing the above-described heating conditions makes it possible to control each of the contents X and Y, which also makes it possible to control the content ratio Z.

In the case where the battery device 50 which is the stacked electrode body is used also, all of the physical property conditions 1 to 3 are satisfied. It is therefore possible to achieve effects similar to those in the case where the battery device 20 which is the wound electrode body is used. In other words, it is possible to achieve a superior electric resistance characteristic and a superior cyclability characteristic.

The separator 23 which is a porous film is used. However, although not specifically illustrated here, a separator of a stacked type including a polymer compound layer may be used instead of the separator 23 which is the porous film.

Specifically, the separator of the stacked type includes a porous film having two opposed surfaces, and the polymer compound layer disposed on one of or each of the two opposed surfaces of the porous film. A reason for this is that adherence of the separator to each of the positive electrode 21 and the negative electrode 22 improves to suppress the occurrence of misalignment (irregular winding of each of the positive electrode 21, the negative electrode 22, and the separator) of the battery device 20. This helps to prevent the secondary battery from easily swelling even if, for example, the decomposition reaction of the electrolytic solution occurs. The polymer compound layer includes a polymer compound such as polyvinylidene difluoride. A reason for this is that the polymer compound such as polyvinylidene difluoride has superior physical strength and is electrochemically stable.

Note that the porous film, the polymer compound layer, or both may each include one or more kinds of insulating particles. A reason for this is that the insulating particles dissipate heat upon heat generation by the secondary battery, thus improving safety or heat resistance of the secondary battery. Examples of the insulating particles include inorganic particles and resin particles. Specific examples of the inorganic particles include particles of: aluminum oxide, aluminum nitride, boehmite, silicon oxide, titanium oxide, magnesium oxide, and zirconium oxide. Specific examples of the resin particles include particles of acrylic resin and particles of styrene resin.

In a case of fabricating the separator of the stacked type, a precursor solution including, without limitation, the polymer compound and an organic solvent is prepared, following which the precursor solution is applied on one of or each of the two opposed surfaces of the porous film. In this case, insulating particles may be added to the precursor solution on an as-needed basis.

In the case where the separator of the stacked type is used also, lithium ions are movable between the positive electrode 21 and the negative electrode 22, and similar effects are therefore obtainable.

The electrolytic solution which is a liquid electrolyte is used. However, although not specifically illustrated here, an electrolyte layer which is a gel electrolyte may be used instead of the electrolytic solution.

In the battery device 20 including the electrolyte layer, the positive electrode 21 and the negative electrode 22 are stacked on each other with the separator 23 and the electrolyte layer interposed therebetween, following which the stack of the positive electrode 21, the negative electrode 22, the separator 23, and the electrolyte layer is wound. The electrolyte layer is interposed between the positive electrode 21 and the separator 23, and between the negative electrode 22 and the separator 23.

Specifically, the electrolyte layer includes a polymer compound together with the electrolytic solution. The electrolytic solution is held by the polymer compound in the electrolyte layer. A reason for this is that liquid leakage is prevented. The configuration of the electrolytic solution is as described above. The polymer compound includes, for example, polyvinylidene difluoride. In a case of forming the electrolyte layer, a precursor solution including, for example, the electrolytic solution, the polymer compound, and an organic solvent is prepared, following which the precursor solution is applied on one side or both sides of the positive electrode 21 and on one side or both sides of the negative electrode 22.

In a case where the electrolyte layer is used also, lithium ions are movable between the positive electrode 21 and the negative electrode 22 via the electrolyte layer, and similar effects are therefore obtainable.

Next, a description is given of applications (application examples) of the above-described secondary battery.

The applications of the secondary battery are not particularly limited. The secondary battery used as a power source serves as a main power source or an auxiliary power source of, for example, electronic equipment and an electric vehicle. The main power source is preferentially used regardless of the presence of any other power source. The auxiliary power source is used in place of the main power source, or is switched from the main power source.

Specific examples of the applications of the secondary battery include: electronic equipment; apparatuses for data storage; electric power tools; battery packs to be mounted on, for example, electronic equipment; medical electronic equipment; electric vehicles; and electric power storage systems. Examples of the electronic equipment include video cameras, digital still cameras, mobile phones, laptop personal computers, headphone stereos, portable radios, and portable information terminals. Examples of the apparatuses for data storage include backup power sources and memory cards. Examples of the electric power tools include electric drills and electric saws. Examples of the medical electronic equipment include pacemakers and hearing aids. Examples of the electric vehicles include electric automobiles including hybrid automobiles. Examples of the electric power storage systems include home battery systems or industrial battery systems for accumulation of electric power for a situation such as emergency. The above-described applications may each use one secondary battery, or may each use multiple secondary batteries.

The battery packs may each include a single battery, or may each include an assembled battery. The electric vehicle is a vehicle that operates (travels) using the secondary battery as a driving power source, and may be a hybrid automobile that is additionally provided with a driving source other than the secondary battery. In an electric power storage system for home use, electric power accumulated in the secondary battery which is an electric power storage source may be utilized for using, for example, home appliances.

An application example of the secondary battery will now be described in detail. The configuration of the application example described below is merely an example, and is appropriately modifiable.

Figure 9:
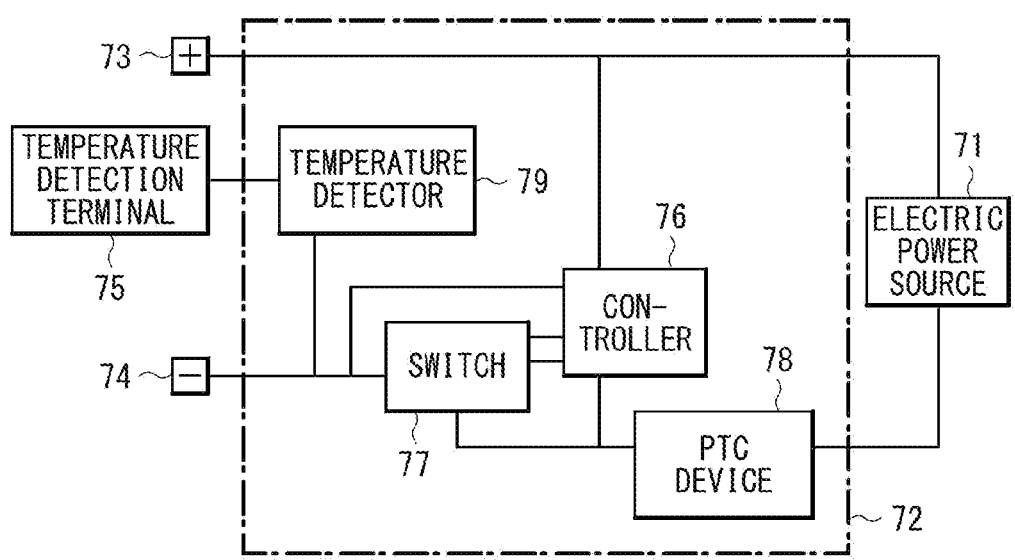
FIG. 9 is a block diagram illustrating a configuration of an application example of the secondary battery.

FIG. 9 illustrates a block configuration of a battery pack. The battery pack described here is a battery pack (a so-called soft pack) including one secondary battery, and is to be mounted on, for example, electronic equipment typified by a smartphone.

As illustrated in FIG. 9, the battery pack includes an electric power source 71 and a circuit board 72. The circuit board 72 is coupled to the electric power source 71, and includes a positive electrode terminal 73, a negative electrode terminal 74, and a temperature detection terminal 75.

The electric power source 71 includes one secondary battery. The secondary battery has a positive electrode lead coupled to the positive electrode terminal 73 and a negative electrode lead coupled to the negative electrode terminal 74. The electric power source 71 is couplable to outside via the positive electrode terminal 73 and the negative electrode terminal 74, and is thus chargeable and dischargeable. The circuit board 72 includes a controller 76, a switch 77, a thermosensitive resistive device (a positive temperature coefficient (PTC) device) 78, and a temperature detector 79. However, the PTC device 78 may be omitted.

The controller 76 includes, for example, a central processing unit (CPU) and a memory, and controls an overall operation of the battery pack. The controller 76 detects and controls a use state of the electric power source 71 on an as-needed basis.

If a voltage of the electric power source 71 (the secondary battery) reaches an overcharge detection voltage or an overdischarge detection voltage, the controller 76 turns off the switch 77. This prevents a charging current from flowing into a current path of the electric power source 71. The overcharge detection voltage and the overdischarge detection voltage are not particularly limited. For example, the overcharge detection voltage is 4.2 V±0.05 V and the overdischarge detection voltage is 2.4 V±0.1 V.

The switch 77 includes, for example, a charge control switch, a discharge control switch, a charging diode, and a discharging diode. The switch 77 performs switching between coupling and decoupling between the electric power source 71 and external equipment in accordance with an instruction from the controller 76. The switch 77 includes, for example, a metal-oxide-semiconductor field-effect transistor (MOSFET). The charging and discharging currents are detected on the basis of an ON-resistance of the switch 77.

The temperature detector 79 includes a temperature detection device such as a thermistor. The temperature detector 79 measures a temperature of the electric power source 71 using the temperature detection terminal 75, and outputs a result of the temperature measurement to the controller 76. The result of the temperature measurement to be obtained by the temperature detector 79 is used, for example, in a case where the controller 76 performs charge/discharge control upon abnormal heat generation or in a case where the controller 76 performs a correction process upon calculating a remaining capacity.

EXAMPLES

A description is given of Examples of the present technology below according to an embodiment.

Examples 1 to 13 to Comparative Examples 1 to 9

Secondary batteries were manufactured, following which the secondary batteries were each evaluated for a battery characteristic as described below.

[Manufacturing of Secondary Battery]

The secondary batteries (lithium-ion secondary batteries) of the laminated-film type illustrated in FIGS. 1 to 4 were manufactured in accordance with the following procedure.

(Fabrication of Positive Electrode)

First, 95 parts by mass of the positive electrode active material, 4 parts by mass of the positive electrode binder (polyvinylidene difluoride), and 1 part by mass of the positive electrode conductor (graphite) were mixed with each other to thereby obtain a positive electrode mixture. Thereafter, the positive electrode mixture was put into an organic solvent (N-methyl-2-pyrrolidone), following which the organic solvent was stirred to thereby prepare a paste positive electrode mixture slurry. Thereafter, the positive electrode mixture slurry was applied on the two opposed surfaces of the positive electrode current collector 21A (a band-shaped aluminum foil having a thickness of 15 μm) by means of a coating apparatus, following which the applied positive electrode mixture slurry was dried to thereby form the positive electrode active material layers 21B. Lastly, the positive electrode active material layers 21B were compression-molded by means of a roll pressing machine. In this manner, the positive electrode active material layers 21B were formed on the respective two opposed surfaces of the positive electrode current collector 21A. Thus, the positive electrode 21 was fabricated.

(Fabrication of Negative Electrode)

First, 90 parts by mass of the negative electrode active material (graphite) and 10 parts by mass of the negative electrode binder (polyvinylidene difluoride) were mixed with each other to thereby obtain a negative electrode mixture. Thereafter, the negative electrode mixture was put into an organic solvent (N-methyl-2-pyrrolidone), following which the organic solvent was stirred to thereby prepare a paste negative electrode mixture slurry. Thereafter, the negative electrode mixture slurry was applied on the two opposed surfaces of the negative electrode current collector 22A (a band-shaped copper foil having a thickness of 15 μm) by means of a coating apparatus, following which the applied negative electrode mixture slurry was dried to thereby form the negative electrode active material layers 22B. Thereafter, the negative electrode active material layers 22B were compression-molded by means of a roll pressing machine. In this manner, the negative electrode active material layers 22B were formed on the respective two opposed surfaces of the negative electrode current collector 22A. Thus, the negative electrode precursor was fabricated. Lastly, as will be described later, the secondary battery was assembled using the negative electrode precursor, following which the stabilization treatment (a first charge and discharge treatment) was performed on the assembled secondary battery. In this manner, the film 22C including sulfur as a constituent element was formed on the surface of each of the negative electrode active material layers 22B. Thus, the negative electrode 22 was fabricated.

(Preparation of Electrolytic Solution)

The electrolyte salt (lithium hexafluorophosphate ($LiPF_6$)) was put into the solvent, following which the solvent was stirred. Used as the solvent were ethylene carbonate and propylene carbonate which are each the cyclic carbonic acid ester, and propyl propionate (PP) which is the chain carboxylic acid ester. In this case, a mixture ratio (a volume ratio) of the solvent between ethylene carbonate, propylene carbonate, and chain carboxylic acid ester was set to 10:20:70, and a content of the electrolyte salt was set to 1 mol/kg with respect to the solvent.

Thereafter, the sulfur-containing compound (propane sultone (PS) which is the cyclic sulfonic acid ester) was added to the solvent including the electrolyte salt, following which the solvent was stirred. In this case, a content of the sulfur-containing compound in the electrolytic solution was set to 1 wt %. Thus, the electrolytic solution including the sulfur-containing compound was prepared.

(Assembly of Secondary Battery)

First, the positive electrode lead 31 (a band-shaped aluminum foil) was welded to the positive electrode 21 (the positive electrode current collector 21A), and the negative electrode lead 32 (a band-shaped copper foil) was welded to the negative electrode precursor (the negative electrode current collector 22A).

Thereafter, the positive electrode 21 and the negative electrode precursor were stacked on each other with the separator 23 (a fine-porous polyethylene film having a thickness of 25 µm) interposed therebetween, following which the stack of the positive electrode 21, the negative electrode precursor, and the separator 23 was wound to thereby fabricate the wound body 20Z. Thereafter, the wound body 20Z was pressed by means of a pressing machine, and was thereby shaped into an elongated shape.

Thereafter, the outer package film 10 was folded in such a manner as to sandwich the wound body 20Z contained inside the depression part 10U, following which the outer edge parts of two sides of the outer package film 10 were thermal-fusion-bonded to each other to thereby allow the wound body 20Z to be contained inside the outer package film 10 having the pouch shape. As the outer package film 10, an aluminum laminated film was used in which a fusion-bonding layer (a polypropylene film having a thickness of 30 µm), a metal layer (an aluminum foil having a thickness of 40 µm), and a surface protective layer (a nylon film having a thickness of 25 µm) were stacked in this order from an inner side. In this case, the outer edge parts of the two sides of the fusion-bonding layer that were opposed to each other were thermal-fusion-bonded to each other.

Lastly, the electrolytic solution was injected into the outer package film 10 having the pouch shape and thereafter, the outer edge parts of the remaining one side of the outer package film 10 (the fusion-bonding layer) were thermal-fusion-bonded to each other in a reduced-pressure environment. In this case, the sealing film 41 (a polypropylene film having a thickness of 5 µm) was interposed between the outer package film 10 and the positive electrode lead 31, and the sealing film 42 (a polypropylene film having a thickness of 5 µm) was interposed between the outer package film 10 and the negative electrode lead 32. In this manner, the wound body 20Z was impregnated with the electrolytic solution, and the wound body 20Z was sealed in the outer package film 10 having the pouch shape. The secondary battery was thus assembled.

(Stabilization of Secondary Battery)

The assembled secondary battery was charged and discharged for one cycle in an ambient temperature environment (at a temperature of 25° C.). Upon charging, the secondary battery was charged with a constant current of 0.1 C until a voltage reached 4.45 V, and was thereafter charged with a constant voltage of 4.45 V until a current reached 0.005 C. Upon the discharging, the secondary battery was discharged with a constant current of 0.1 C until the voltage reached 3.0 V. Note that 0.1 C is a value of a current that causes a battery capacity (a theoretical capacity) to be completely discharged in 10 hours, and 0.005 C is a value of a current that causes the battery capacity to be completely discharged in 200 hours.

In this case, portions (the wound parts 201 and 203) of the wound body 20Z were heated by a heater. In the heating treatment, a heating temperature was varied within a range from 60° C. to 80° C. both inclusive, and a heating time was varied within a range from 1 hour to 24 hours both inclusive.

In this manner, as described above, the film 22C was formed on the surface of each of the negative electrode active material layers 22B in the negative electrode precursor, and the negative electrode 22 was thus fabricated. As a result, the battery device 20 was fabricated and the state of the secondary battery was electrochemically stabilized. The secondary battery of the laminated-film type was thus completed.

After the secondary battery was completed, the secondary battery was disassembled to thereby collect the negative electrode 22. Thereafter, the negative electrode 22 (the film 22C) was analyzed by ICP optical emission spectroscopy to thereby calculate each of the contents X and Y (µmol/m$^2$) and the content ratio Z, which revealed the results presented in Tables 1 to 3.

In the process of manufacturing the secondary battery, each of the contents X and Y and the content ratio Z was adjusted by varying the heating conditions (the heating temperature and the heating time) upon the stabilization treatment.

Evaluation of the secondary batteries for their battery characteristics (the electric resistance characteristic and the cyclability characteristic) revealed the results presented in Tables 1 to 3. Here, the evaluation of the cyclability characteristic included evaluation of two kinds of cyclability characteristics.

In a case of examining the electric resistance characteristic, first, the secondary battery was charged in an ambient temperature environment (at a temperature of 23° C.), following which the electric resistance (a pre-storage electric resistance) of the secondary battery was measured. Charging conditions were similar to those in the case of performing the stabilization treatment on the secondary battery described above. Thereafter, the secondary battery in the charged state was stored (for a storing time of 1 month) in a high-temperature environment (at a temperature of 60° C.), following which the electric resistance (a post-storage electric resistance) of the secondary battery was measured. Lastly, a resistance variation rate (%) which is an index for evaluating the electric resistance characteristic was calculated on the basis of the following calculation expression: resistance variation rate=(post-storage electric resistance/pre-storage electric resistance)×100.

In a case of examining the cyclability characteristic of a first kind, first, the secondary battery was charged and discharged in an ambient temperature environment (at a temperature of 23° C.) to thereby measure a discharge capacity (a first-cycle discharge capacity). Thereafter, the secondary battery was left to stand (for a leaving time of 1 month) in the same environment. Thereafter, the secondary battery was repeatedly charged and discharged in the same environment until the number of cycles (the number of times of charging and discharging) reached 100 to thereby measure the discharge capacity (a 100th-cycle discharge capacity). Lastly, a capacity retention rate 1(%) which is an index for evaluating the cyclability characteristic was calculated on the basis of the following calculation expression: capacity retention rate 1=(100th-cycle discharge capacity/first-cycle discharge capacity)×100. Charging and discharging conditions were similar to the charging conditions in the case of performing the stabilization treatment on the secondary battery described above, except that the current at the time of charging and the current at the time of discharging were each changed to 3 C. Note that 3 C is a value of a current that causes the battery capacity to be completely discharged in 10/3 hours.

In a case of examining the cyclability characteristic of a second kind, a capacity retention rate 2(%) which is another index for evaluating the cyclability characteristic was calculated by a procedure similar to that of the case of examining the cyclability characteristic of the first kind, except that the leaving time of the secondary battery was changed to 12 months.

TABLE 1

| | Electrolytic solution | | | | Film | | | Resistance | Capacity | Capacity |
| | Chain carboxylic acid ester | | Sulfur-containing compound | | | | | | | |
| | Kind | Content (vol %) | Kind | Content (wt %) | Content X ($\mu mol/m^2$) | Content Y ($\mu mol/m^2$) | Content ratio Z | variation rate (%) | retention rate 1 (%) | retention rate 2 (%) |
|---|---|---|---|---|---|---|---|---|---|---|
| Comparative example 1 | PP | 70 | PS | 1 | 15.0 | 15.0 | 1.0 | 305 | 94 | 78 |
| Comparative example 2 | PP | 70 | PS | 1 | 10.0 | 10.0 | 1.0 | 197 | 90 | 60 |
| Comparative example 3 | PP | 70 | PS | 1 | 12.5 | 12.5 | 1.0 | 240 | 90 | 68 |
| Comparative example 4 | PP | 70 | PS | 1 | 15.0 | 13.6 | 1.1 | 288 | 94 | 78 |
| Example 1 | PP | 70 | PS | 1 | 15.0 | 12.5 | 1.2 | 260 | 94 | 82 |
| Example 2 | PP | 70 | PS | 1 | 15.0 | 10.7 | 1.4 | 222 | 94 | 88 |
| Example 3 | PP | 70 | PS | 1 | 15.0 | 9.4 | 1.6 | 201 | 95 | 90 |
| Example 4 | PP | 70 | PS | 1 | 15.0 | 7.9 | 1.9 | 188 | 93 | 82 |
| Example 5 | PP | 70 | PS | 1 | 15.0 | 7.1 | 2.1 | 179 | 91 | 71 |
| Comparative example 5 | PP | 70 | PS | 1 | 15.0 | 6.8 | 2.2 | 175 | 90 | 59 |

TABLE 2

| | Electrolytic solution | | | | Film | | | Resistance | Capacity | Capacity |
| | Chain carboxylic acid ester | | Sulfur-containing compound | | | | | | | |
| | Kind | Content (vol %) | Kind | Content (wt %) | Content X ($\mu mol/m^2$) | Content Y ($\mu mol/m^2$) | Content ratio Z | variation rate (%) | retention rate 1 (%) | retention rate 2 (%) |
|---|---|---|---|---|---|---|---|---|---|---|
| Comparative example 6 | PP | 70 | PS | 1 | 10.0 | 6.3 | 1.6 | 171 | 93 | 66 |
| Example 6 | PP | 70 | PS | 1 | 11.0 | 6.9 | 1.6 | 177 | 93 | 73 |
| Example 7 | PP | 70 | PS | 1 | 13.0 | 8.1 | 1.6 | 190 | 95 | 87 |
| Example 3 | PP | 70 | PS | 1 | 15.0 | 9.4 | 1.6 | 201 | 95 | 90 |
| Example 8 | PP | 70 | PS | 1 | 18.0 | 11.3 | 1.6 | 218 | 96 | 87 |
| Example 9 | PP | 70 | PS | 1 | 22.0 | 13.8 | 1.6 | 262 | 97 | 82 |
| Comparative example 7 | PP | 70 | PS | 1 | 23.0 | 14.4 | 1.6 | 312 | 96 | 80 |

TABLE 3

| | Electrolytic solution | | | | Film | | | Resistance | Capacity | Capacity |
| | Chain carboxylic acid ester | | Sulfur-containing compound | | | | | | | |
| | Kind | Content (vol %) | Kind | Content (wt %) | Content X (μmol/m²) | Content Y (μmol/m²) | Content ratio Z | variation rate (%) | retention rate 1 (%) | retention rate 2 (%) |
|---|---|---|---|---|---|---|---|---|---|---|
| Comparative example 8 | PP | 70 | PS | 1 | 9.6 | 6.0 | 1.6 | 170 | 93 | 62 |
| Example 10 | PP | 70 | PS | 1 | 11.2 | 7.0 | 1.6 | 175 | 93 | 75 |
| Example 11 | PP | 70 | PS | 1 | 12.5 | 8.0 | 1.6 | 183 | 93 | 80 |
| Example 3 | PP | 70 | PS | 1 | 15.0 | 9.4 | 1.6 | 201 | 95 | 90 |
| Example 12 | PP | 70 | PS | 1 | 17.6 | 11.0 | 1.6 | 225 | 95 | 85 |
| Example 13 | PP | 70 | PS | 1 | 20.8 | 13.0 | 1.6 | 254 | 96 | 81 |
| Comparative example 9 | PP | 70 | PS | 1 | 21.0 | 14.0 | 1.5 | 289 | 96 | 77 |

As indicated in Tables 1 to 3, the resistance variation rate and the capacity retention rates 1 and 2 of the secondary battery in which the electrolytic solution (the solvent) included the chain carboxylic acid ester each varied greatly depending on the contents X and Y and the content ratio Z of the film 22C.

Specifically, in a case where not all of the physical property conditions 1 to 3 (the content X was within the range from 11 μmol/m² to 22 μmol/m² both inclusive, the content Y was within the range from 7 μmol/m² to 13 μmol/m² both inclusive, and the content ratio Z was within the range from 1.2 to 2.1 both inclusive) were satisfied (Comparative examples 1 to 9), a trade-off relationship was exhibited in which improvement of any of the resistance variation rate and the capacity retention rates 1 and 2 caused degradation of the others. Thus, not all of the resistance variation rate and the capacity retention rates 1 and 2 were improved.

In contrast, in a case where all of the physical property conditions 1 to 3 were satisfied (Examples 1 to 13), the above-described trade-off relationship was overcome, which allowed for improvement in all of the resistance variation rate and the capacity retention rates 1 and 2.

In particular, in the case where all of the physical property conditions 1 to 3 were satisfied, the following tendencies were observed. First, the use of propyl propionate as the chain carboxylic acid ester allowed for sufficient improvement in all of the resistance variation rate and the capacity retention rates 1 and 2. Second, the use of the cyclic sulfonic acid ester as the sulfur-containing compound allowed for sufficient improvement in all of the resistance variation rate and the capacity retention rates 1 and 2.

Examples 14 to 17

The secondary batteries were fabricated by a similar procedure except that the sulfur-containing compound was changed in kind, and were thereafter evaluated for their battery characteristics. Newly used as the sulfur-containing compound were propene sultone (PRS) which is the cyclic sulfonic acid ester, propargyl methanesulfonate (PMS) which is the chain sulfonic acid ester, the propane disulfonic acid anhydride (PSAH) which is the cyclic disulfonic acid anhydride, and the sulfopropionic acid anhydride (SPAH) which is the cyclic sulfonic acid carboxylic acid anhydride.

TABLE 4

| | Electrolytic solution | | | | Film | | | Resistance | Capacity | Capacity |
| | Chain carboxylic acid ester | | Sulfur-containing compound | | | | | | | |
| | Kind | Content (vol %) | Kind | Content (wt %) | Content X (μmol/m²) | Content Y (μmol/m²) | Content ratio Z | variation rate (%) | retention rate 1 (%) | retention rate 2 (%) |
|---|---|---|---|---|---|---|---|---|---|---|
| Example 3 | PP | 70 | PS | 1 | 15.0 | 9.4 | 1.6 | 201 | 95 | 90 |
| Example 14 | PP | 70 | PRS | 1 | 15.0 | 9.4 | 1.6 | 208 | 94 | 86 |
| Example 15 | PP | 70 | PMS | 1 | 15.0 | 9.4 | 1.6 | 208 | 93 | 88 |
| Example 16 | PP | 70 | PSAH | 1 | 15.0 | 9.4 | 1.6 | 204 | 93 | 87 |
| Example 17 | PP | 70 | SPAH | 1 | 15.0 | 9.4 | 1.6 | 206 | 94 | 85 |

As indicated in Table 4, results similar to those indicated in Tables 1 to 3 were obtained even if the sulfur-containing compound was changed in kind. In other words, if all of the physical property conditions 1 to 3 were satisfied, it was possible to improve all of the resistance variation rate and the capacity retention rates 1 and 2.

Based upon the results presented in Tables 1 to 4, all of the resistance variation rate and the capacity retention rates 1 and 2 improved if: the film 22C of the negative electrode 22 included sulfur as a constituent element; the electrolytic solution included the chain carboxylic acid ester; and all of the physical property conditions 1 to 3 were satisfied. The secondary battery therefore achieved a superior electric resistance characteristic and a superior cyclability characteristic.

Although the present technology has been described above with reference to one or embodiments including Examples, the configuration of the present technology is not limited thereto, and is therefore modifiable in a variety of suitable ways.

Specifically, the description has been given of the case where the secondary battery has a battery structure of the laminated-film type. However, the battery structure of the secondary battery is not particularly limited, and may thus be, for example, a cylindrical type, a prismatic type, a coin type, or a button type.

Further, the description has been given of the case where the battery device has a device structure of a wound type and the case where the battery device has a device structure of a stacked type. However, the device structure of the battery device is not particularly limited, and may thus be, for example, a zigzag folded type in which the positive electrode and the negative electrode are folded in a zigzag manner.

Further, although the description has been given of the case where the electrode reactant is lithium, the electrode reactant is not particularly limited. Specifically, the electrode reactant may be another alkali metal such as sodium or potassium, or may be an alkaline earth metal such as beryllium, magnesium, or calcium, as described above. In addition, the electrode reactant may be another light metal such as aluminum.

The effects described herein are mere examples, and effects of the present technology are therefore not limited thereto and may achieve any other suitable effect.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
a positive electrode;
a negative electrode;
a negative electrode wiring line coupled to the negative electrode; and
an electrolytic solution, wherein
the negative electrode includes a negative electrode active material layer and a film, the film covering a surface of the negative electrode active material layer,
the film includes sulfur as a constituent element,
the electrolytic solution includes a chain carboxylic acid ester, and,
where the film is divided, in a direction away from the negative electrode wiring line, into thirds including a first film part, a second film part, and a third film part,
a content of sulfur in the first film part, the third film part, or each of the first film part and the third film part is greater than or equal to 11 micromoles per square meter and less than or equal to 22 micromoles per square meter,
a content of sulfur in the second film part is greater than or equal to 7 micromoles per square meter and less than or equal to 13 micromoles per square meter, and
a ratio of the content of sulfur in the first film part, the third film part, or each of the first film part and the third film part to the content of sulfur in the second film part is greater than or equal to 1.2 and less than or equal to 2.1.

2. The secondary battery according to claim 1, wherein the chain carboxylic acid ester includes at least one of ethyl acetate, propyl acetate, ethyl propionate, or propyl propionate.

3. The secondary battery according to claim 1, wherein the electrolytic solution further includes a sulfur-containing compound.

4. The secondary battery according to claim 3, wherein the sulfur-containing compound includes at least one of a cyclic sulfonic acid ester, a chain sulfonic acid ester, a cyclic disulfonic acid anhydride, or a cyclic sulfonic acid carboxylic acid anhydride.

5. The secondary battery according to claim 1, wherein the secondary battery comprises a lithium-ion secondary battery.

* * * * *